Patented Dec. 4, 1945

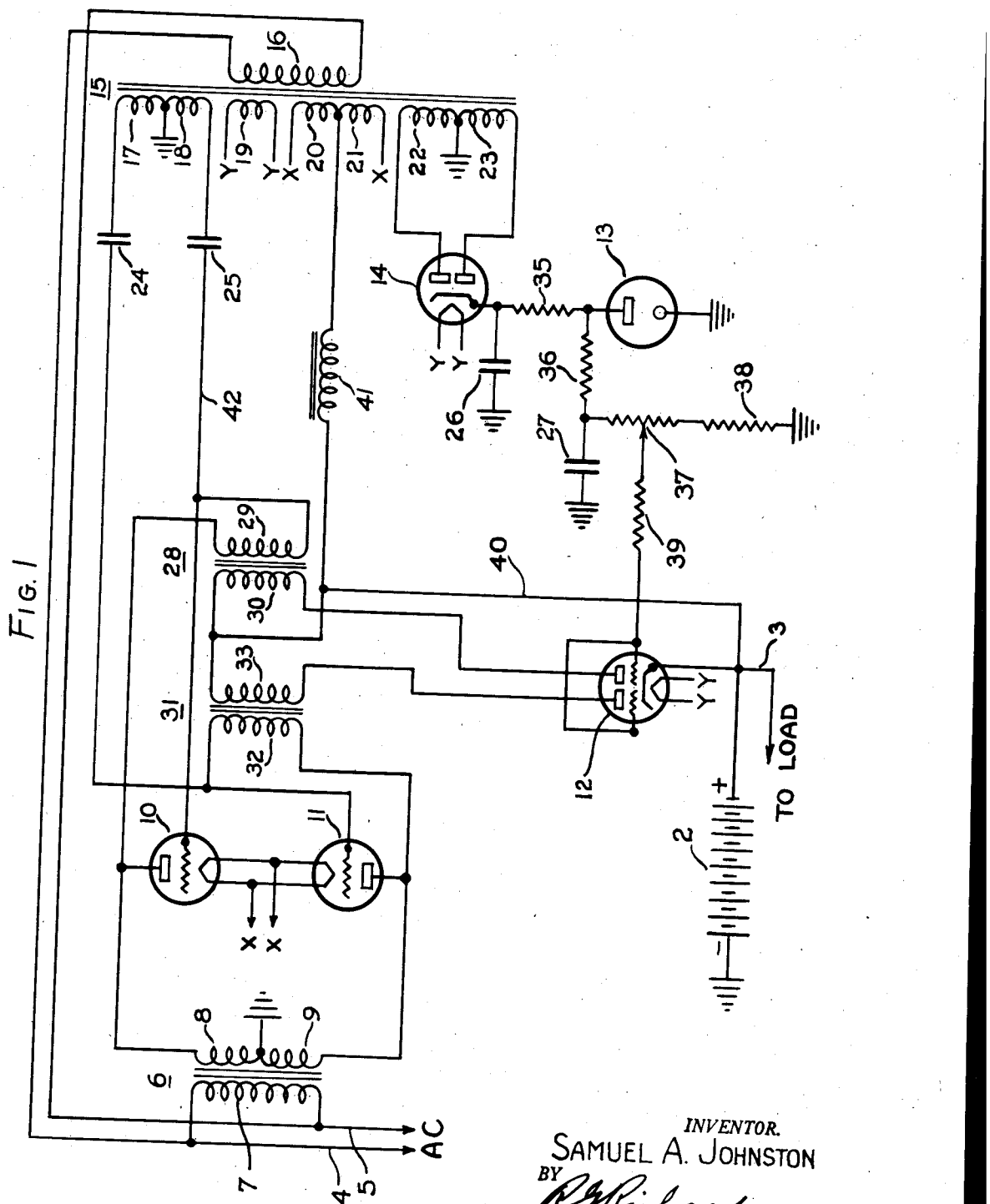

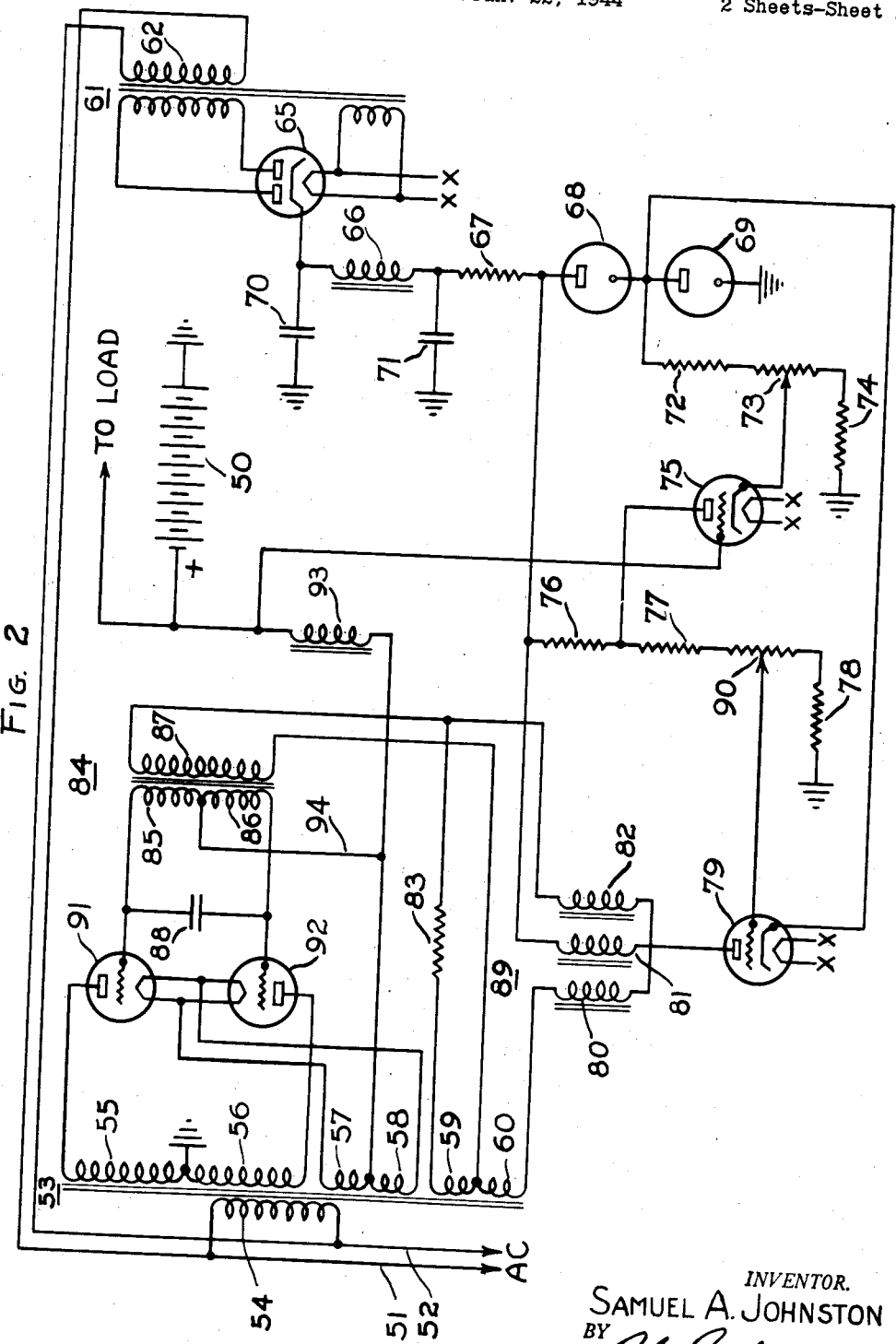

2,390,151

UNITED STATES PATENT OFFICE 2,390,151

AUTOMATIC BATTERY CHARGING SYSTEM

Samuel A. Johnston, Delavan, Wis., assignor to George W. Borg Corporation, Chicago, Ill., a corporation of Delaware Application January 22, 1944, Serial No. 519,368

10 Claims. (Cl. 320—10)

The present invention relates to automatic battery charging systems such as may be used for charging storage batteries in service, and the object of the invention is to produce a battery charging system of this character which is adapted to maintain the battery voltage substantially constant under widely varying load conditions.

A feature of the invention is an arrangement which continuously compares the battery voltage with a standard voltage and regulates the charging rate in accordance with the difference between said voltages.

A further feature is the use of a direct current amplifier in connection with the foregoing to amplify any difference existing between the battery voltage and the standard voltage to increase the sensitivity of the charge regulating apparatus.

The foregoing and other features of the invention will be described more fully hereinafter with reference to the accompanying drawings, in which—

Fig. 1 is a diagrammatic circuit drawing showing the apparatus and circuits of a battery charging system embodying the invention; and Fig. 2 is a similar drawing showing the apparatus and circuits of a modified battery charging system which includes the feature of amplifying the differences which may exist between the battery voltage and the standard voltage.

Referring to Fig. 1, the battery to be charged is indicated by the reference character 2 and may be an ordinary storage battery having, for example, eighteen cells and a voltage of approximately 36 volts.

The battery may have any desired capacity. It may be, for example, a relatively small battery of 40 ampere hour capacity, or sufficient to carry a load of 3 amperes for 10 hours or more.

The load may be connected to the battery by way of conductor 3 as indicated in the drawings. The load may be constant, variable, or intermittent, and it may be assumed that a substantially constant voltage is required. It is this requirement, in connection with the variable or intermittent character of the load, which makes it desirable to accurately regulate the charging rate.

Power for the charging apparatus is supplied over the conductors 4 and 5, which are assumed to be connected to a suitable source of commercial alternating current, as indicated.

The reference character 6 indicates a transformer, having a primary winding 7 and the two secondary windings 8 and 9. The primary winding 7 is connected across the supply conductors 4 and 5.

The tubes 10 and 11 may be gas filled arc discharge tubes which are generally known as thyratrons. Type C6J tubes may be used. These tubes, together with the transformer 6 and certain circuit connections which will be described, constitute a full wave rectifier which supplies direct current for charging the battery 2. The thyratrons are grid controlled and the charging rate is regulated by varying the phase or phase and amplitude of the grid voltage with respect to the anode voltage.

The tube 12 may be a type 6N7 double triode and is used to compare the battery voltage with the standard voltage and control the phase shifting circuits.

The tube 14 is a full wave rectifier tube, type 6H6, for example, and is used to supply direct current to a circuit which includes the voltage regulating tube 13. The latter may be a type VR-105 tube, for example, and is used to supply the standard voltage.

A second transformer is indicated at 15, and has a primary winding 16 connected across the power leads 4 and 5, and a number of secondary windings as shown. The secondary winding 19 supplies current to the cathode heater circuits of tubes 12 and 14. The windings 20 and 21 supply current for heating the cathodes of the thyratrons 10 and 11. The windings 22 and 23 supply current to the circuit which includes the rectifier tube 14 and the voltage regulating tube 13.

The windings 17 and 18 of the transformer 15 are used to complete the phase shifting circuits for the grids of the thyratrons 10 and 11 and are effectively connected in series with the windings 9 and 8, respectively, of the transformer 6. These phase shifting circuits also include the primary windings 29 and 32 of transformers 28 and 31 and the condensers 24 and 25, which may be of .2 mf. capacity. The secondary windings of transformers 28 and 31 are connected in the anode circuits of tube 12.

The identity of other circuit elements not specifically referred to in the foregoing will be obvious, or at any rate will be made clear in the course of the ensuing explanation of the operation of the system.

Assuming that the equipment is connected up as shown and described, there will be a flow of current over a circuit which extends from ground by way of the voltage regulating tube 13, resistor 35, cathode of rectifier tube 14, anodes of said tube and windings 22 and 23 of transformer 15 to ground. It will be understood that the foregoing circuit includes the winding 22 during the half cycles when the ungrounded end of the winding is positive and includes the winding 23 during the alternate half cycles. The transformer windings are so proportioned that the output voltage is somewhat higher than 105 volts. It may be about 135 volts, for example. The resistor 35 may have a resistance of about 10,000 ohms and limits the current to a low value. The voltage regulating tube 13 functions to maintain a substantially constant voltage of 105 volts across its terminals notwithstanding any ordinary changes in the power supply voltage which may occur.

The standard voltage is derived from a shunt circuit which is connected across the tube 13 and which includes the resistor 36, the potentiometer 37 and the resistor 38. The values of resistors 36 and 38 are such that the range of the potentiometer 37 will include the desired standard voltage, suited to the voltage of the battery to be charged. For a 36 volt battery the standard voltage may be 38 volts, for example, but this value may be varied somewhat depending on the condition of charge to be maintained and other factors. The condensers 26 and 27 are by-pass or filter condensers which function to maintain a substantially steady current flow through the potentiometer and insure that the standard voltage picked up by the slider thereof will be substantially free of ripples.

The standard voltage as determined by the setting of the potentiometer 37 is applied to the grids of tube 12 by way of the resistor 39 which may have a resistance of about 100,000 ohms. This resistor limits the grid current that may flow and prevents the grid potential from rising too high in a positive direction. The cathode of tube 12 is connected to the positive pole of the battery 2. Any difference that may exist between the standard voltage and the battery voltage is thus manifested as a difference in potential between the grids and the cathode of the tube.

It will be assumed now that the battery is fully charged and that the load is zero. Under these conditions the voltage across each cell will be approximately 2.15 volts and the voltage of the battery will be approximately 38.7 volts. If the potentiometer is adjusted for a standard voltage of about 38 volts, as will be assumed, the potential on the grid will be approximately .7 volt negative with respect to the cathode and the current flow through the tube will be low, resulting in a minimum or zero charging rate. The manner in which this result is attained will now be explained.

The charging circuit may be traced from ground by way of the battery 2, conductor 40, choke 41, transformer windings 20 and 21 in parallel, conductors X—X in parallel, the cathode and anode of thyratron 10, and the winding 8 of transformer 6 to ground. This is the circuit over which the charging current flows during the half cycles when the anode of thyratron 10 is positive. During the alternate half cycles, when the anode of thyratron 11 is positive, the circuit is the same except that it includes the thyratron 11 and the transformer winding 9.

The average current which flows over the charging circuit, or the charging rate, depends upon the phase relation between the grid voltages and the anode voltages at the thyratrons 10 and 11, and the charging rate is regulated by shifting the phase of the grid voltages with respect to the anode voltages.

The maximum charging rate is attained when the grid voltages are nearly in phase with the anode voltages and is determined by the resistance in the circuit and the output voltage of the transformer 6, which should be so designed that the charging rate cannot be high enough to damage the thyratrons 10 and 11.

The phase shifting circuit for the grid of the thyratron 10 may be traced from ground by way of transformer winding 18, condenser 25, conductor 42, primary winding 29 of transformer 28, and winding 8 of transformer 6 to ground. The grid of thyratron 10 is connected to this circuit at the junction of the transformer winding 29 and the condenser 25. Alternating current flows in the circuit by virtue of the voltages generated in the winding 8 of transformer 6 and winding 18 of transformer 15, which are in phase, and alternating voltages are impressed on the grid of Thyratron 10. The grid voltage lags behind the anode voltage by an amount which depends on the relation between the impedance of the transformer winding 29 and the impedance of the condenser 25. The variable factor is the impedance of winding 29, which can be varied to give a working range of phase shift from about 20 degrees lagging to about 175 degrees lagging.

The phase shifting circuit for the grid of the thyratron 11 is similar to the phase shifting circuit just described and includes the winding 17 of transformer 15, condenser 24, winding 32 of transformer 31, and winding 9 of transformer 6. The grid of thyratron 11 is connected to the circuit at the junction of the winding 32 and condenser 24 and the phase of the grid voltage with respect to the anode voltage is varied by varying the impedance of the transformer winding 32.

It may be stated now that the impedance of the transformer windings 29 and 32 in the phase shifting circuits is varied by varying the load on the associated secondary windings 30 and 33. This is accomplished by means of the tube 12, the cathode anode circuits of which include the secondary windings 30 and 33. The rate of current flow through the tube 12 and the load on the transformers 28 and 31 are determined by the grid potential at tube 12.

According to the assumption previously made the battery is approximately fully charged and has a voltage of 38.7 volts. The standard voltage being 38 volts, the grid of tube 12 is negative with respect to the cathode by .7 volt. Under these conditions the charging rate is a minimum and may be zero, as previously stated.

Explaining this somewhat more in detail, the negative potential on the grids of tube 12 results in a low current flow in the cathode anode circuits of the tube, which include the secondary windings of the transformers 28 and 31, and consequently the impedance of the primary windings 29 and 32 is relatively high. Under this condition the grid voltages at the thyratrons 10 and 11 are shifted in phase with respect to the anode voltages by a large angle. The grid voltages may lag behind the anode voltages by as much as 170 or 175 degrees, for example, depending on the exact condition of the battery and the adjustment of the standard voltage. The thyratrons fire very late, therefore, if they fire at all, and the charging rate is a minimum. Since the battery will eventually become fully charged and attain a maximum voltage, whether the thyratrons cease firing and stop the charge under this condition depends on the adjustment of the standard voltage. It will be obvious, for instance, that the standard voltage can be set so high that the battery can never develop sufficient negative potential on the grid of tube 12 to create the phase shift which is required to cause the thyratrons to stop firing, and with this adjustment the charging operation will continue indefinitely. With a proper adjustment of the standard voltage the charging rate for continuous charge can be made very low, just sufficient to maintain the battery in fully charged condition.

It will generally be preferable, however, to set the standard voltage somewhat lower than indicated in the foregoing, or low enough so that the charging operation will stop when the battery becomes approximately fully charged. After the battery has stopped charging, its voltage will fall gradually until after a few hours it will become low enough to start the charge again, whereupon the charging operation will be continued for a short time to restore the battery to its former condition.

The exact standard voltage which is necessary to secure the desired result will vary somewhat, depending on how the circuit elements respond to changes in potential on the grids of the tube 12. The characteristics of this tube and the sensitivity of the phase shifting circuits are factors which will influence the adjustment.

In the foregoing the operation under the no load condition has been explained. The operation with load will now be considered. For the particular battery in connection with which the charging system is being described the load may be about 3 amperes.

It will be assumed that when the load is applied the battery is fully charged and that the charging operation has stopped. Upon the application of the load the voltage of the battery starts to fall rapidly and were it not for the automatic charging system would shortly reach a value determined by the amount of current flowing and the internal resistance of the battery. The drop in voltage might be as much as several volts. When the voltage starts to fall, however, the grids of tube 12 become less negative with respect to the cathode, tube 12 passes more current, the impedance of the transformer windings 29 and 32 is decreased, and the phase of the grid voltages at the thyratrons 10 and 11 is advanced far enough so that the tubes start to fire. This occurs almost instantly when the load is applied. Since the thyratrons start to fire when the grid voltages lag the anode voltages by as much as about 170 degrees, however, the thyratrons fire very late at the start and cannot pass enough current to carry the load. The voltage of the battery continues to drop, therefore, and the grid voltages at the thyratrons are progressively advanced in phase responsive thereto until the current output of the charging system is equal to the load. At this point the battery ceases to supply current to the load and its voltage stops falling, becoming constant with constant load at a value which is just enough below the no load voltage to bring about the phase shift which is required to enable the charging system to carry the load.

The amount of the voltage drop at the battery between no load and full load depends on a number of factors, including the capacity of the charging system with respect to the load, which determines the amount of phase shift required to cause the charging system to pick up the load, and the sensitivity of the phase shifting circuits. It would not be economical to provide a charging system having a capacity greatly in excess of the load and ordinarily, therefore, the grid voltages will have to be shifted over the greater portion of the range extending from about 175 degrees lagging, where the thyratrons cease to fire, to about 20 degrees lagging, where each thyratron passes current during a full half cycle. This means that the voltage drop at the battery depends largely on the sensitivity of the phase shifting circuits. In the system described a drop of less than 1 volt can be expected.

It will be understood that the charging system responds to fluctuations in the load to regulate the output of the system accordingly. If the load decreases, for example, a part of the output of the charging system will be taken by the battery and its voltage will rise, thereby decreasing the output of the charging system. If the load should increase, on the other hand, part of it will be temporarily supplied from the battery, which lowers the battery voltage and increases the output of the charging system.

The charging system should have sufficient capacity to handle the maximum load normally to be expected, and it will be understood that unless this condition obtains the voltage of the battery will not be maintained within the narrow range described. If an overload should be imposed or if the charging system should fail for some reason, such as loss of commercial power, the battery will have to carry part or all of the load and its voltage will fall somewhat lower than the value at which it is maintained by the charging system under normal conditions.

The charging system shown in Fig. 1 is well adapted for charging batteries having a voltage of 36 volts or higher, and the higher the voltage the smaller will be the fluctuation in battery voltage as a percentage of the battery voltage sought to be maintained. This charging system can also be used for charging batteries of lower voltage, 24 volts, for example, in case especially accurate regulation is not required. For any voltage lower than about 36 volts, however, the charging system shown in Fig. 2 is to be preferred, as it is more sensitive in its response to fluctuations in the battery voltage. This system shown in Fig. 2, of course, may be used in connection with batteries having a voltage of 36 volts or higher, but when the battery voltage is as high as this the increased sensitivity usually will not be required.

Referring to Fig. 2, the battery to be charged is indicated at 50 and may be a twelve cell storage battery having a voltage of approximately 24 volts and any desired capacity.

Power is supplied over the conductors 51 and 52, to which are connected the primary windings 54 and 62 of transformers 53 and 61. The transformer 53 supplies current for the charging circuit and the phase shifting circuit, while the transformer 61 supplies current to the circuit from which the standard voltage is obtained.

The standard voltage circuit includes the full wave rectifier tube 65, a filter comprising the choke coil 66 and the condensers 70 and 71, resistor 67, and the voltage regulating tubes 68 and 69. The voltage across the tube 69 is 105 volts and the voltage across both tubes 68 and 69 is 210 volts. The standard voltage is picked up at the slider of the potentiometer 73, which is included along with the resistors 72 and 74 in a shunt around the tube 69.

The tube 75 may be a type 6J5 triode, and has its grid connected to the positive pole of the battery 50, while its cathode is connected to the slider of the potentiometer 73. This tube is used for comparing the battery voltage with the standard voltage.

There is a shunt or voltage divider circuit connected across the two voltage regulating tubes 68 and 69 and including the resistor 76, resistor 77, potentiometer 90, and resistor 78. The anode of the tube 75 is connected to the voltage divider circuit at the junction of resistors 76 and 77.

The reference character 89 indicates a saturable reactor having windings 80, 81 and 82. The windings 80 and 82 are included in the phase shifting circuit and constitute the variable element thereof. The phase shifting circuit will be described shortly. The winding 81 is the saturating winding of the reactor and varies the impedance of the windings 80 and 82.

Current flow through the winding 81 of the reactor 89 is controlled by tube 79, which may be another type 6J5 tube. The anode of the tube is connected through winding 81 to the junction of resistor 67 and the voltage regulating tube 68. The grid is connected to the slider of potentiometer 90, while the cathode is connected to the junction of the voltage regulating tubes 68 and 69. These connections provide an anode voltage of 105 volts. The use of the voltage regulating tube 68 instead of a resistor insures a substantially constant anode voltage at tubes 79 and 75.

The tubes 91 and 92 may be type C6J thyratron tubes. The anodes of these tubes are connected to the ungrounded terminals of the secondary windings 55 and 56 of the transformer 53. The cathodes of the tubes are connected in parallel to the windings 57 and 58 of transformer 53, which supply heating current for the cathodes. The arrangement is similar to the arrangement of the thyratron tubes in Fig. 1 and constitutes a full wave rectifier which supplies the direct current output of the charging system.

The phase shifting circuit for controlling the phase of the grid voltages at the thyratrons 91 and 92 is a bridge circuit to which alternating current is supplied by the windings 59 and 60 of the transformer 53. These two transformer windings are two arms of the bridge circuit. The third arm of the bridge circuit is the resistor 83, while the windings 80 and 82 of the saturable reactor 89 constitute the fourth arm. The output of the bridge is developed across the primary winding 87 of the transformer 84, which is connected between the junction of windings 59 and 60 and the junction of the resistor 83 and the reactor winding 82.

The secondary windings 85 and 86 of the transformer 84 are connected to the grids of the thyratrons 91 and 92, respectively. A condenser 88 is connected as shown to tune the transformer to approximately 60 cycles and is of value in suppressing harmonics that might otherwise be present. The conductor 94 is the grid return conductor and is connected between the junction of windings 85 and 86 and the junction of windings 57 and 58.

The operation of the circuit will now be explained briefly. For this purpose it will be assumed that the battery 50 is fully charged, and that the load is off. Under these conditions the voltage of the battery is approximately 25.8 volts. The tube 75 is operated with a considerable negative grid bias and accordingly the standard voltage is considerably higher than the voltage of the battery when the battery is fully charged. The standard voltage may be 29.5 volts, for example. The standard voltage being applied to the cathode of tube 75 and the battery voltage to the grid, the potential of the grid will be 3.7 volts negative with respect to the cathode potential. This grid biasing potential is appreciably higher than the cut-off potential, which may be —10 volts or even less, and the tube, therefore, passes a substantial amount of current.

The slider of potentiometer 90 is adjusted so that under the described conditions obtaining at tube 75 the grid of tube 79 has a high negative grid bias, sufficient to reduce the current flow in the anode circuit to a very low value. The winding 81 of the saturable reactor 89 accordingly produces only a very low flux in the reactor field, the impedance of the windings 80 and 82 is high, and the phase shifting circuit impresses voltages on the grids of the thyratrons 91 and 92 which lag far behind the anode voltages. The difference in phase may be 175 degrees or more, or sufficient to prevent the tubes 91 and 92 from firing. The battery is not on charge, therefore.

The foregoing explains briefly the conditions existing throughout the circuit when the battery is fully charged and is not carrying any load.

When the load is applied the battery voltage starts to fall, thereby increasing the negative bias on the grid of tube 75 and decreasing the current flow in the anode circuit of this tube. As a result the potential on the grid of tube 79 starts to rise, that is, the grid potential becomes less negative, and the current in the anode circuit increases. The increased current flow through winding 81 of the saturable reactor 89 increases the flux in the reactor field and decreases the impedance of windings 80 and 82 in the phase shifting circuit, thus reducing the phase angle by which the grid voltages at the thyratrons 91 and 92 lag the anode voltages and causing the thyratrons to start to fire.

The rectifier comprising the thyratrons 91 and 92 now becomes operative and supplies direct current to the battery charging circuit, which may be traced from ground by way of battery 50, choke coil 93, windings 57 and 58 of transformer 53, thyratrons 91 and 92 alternately, and windings 55 and 56 of transformer 53 alternately to ground. This is the circuit over which the battery is charged, when charging is taking place, but under the conditions which now obtain the rectifier output will be taken by the load.

The described operations, which have resulted in the starting of the rectifier, continues progressively until the grid voltages at the thyratrons have been advanced in phase sufficiently to enable the rectifier to carry the load. The battery 50 thereupon ceases to supply current and its voltage becomes stationary at a slightly reduced value.

It will be appreciated that the operation of the circuit is somewhat similar to the operation of the circuit shown in Fig. 1. If the load is increased, the increment is supplied momentarily by the battery, which reduces its voltage slightly and further advances the phase of the grid voltages at the thyratrons to enable them to handle the increased load. If the load is decreased, on the other hand, the battery starts to charge, its voltage rises, and the grid voltages at the thyratrons are retarded in phase to reduce the output of the rectifier.

When the load is removed the rectifier continues in operation and charges the battery until its voltage rises sufficiently to stop the charging operation. The equipment is thus restored to the condition assumed originally, in which the load is off and the battery is fully charged.

Between no load and full load the voltage of the battery is maintained in a narrow range. That the range is quite narrow will be appreciated from the fact that any change which occurs in the grid potential at tube 75 is amplified many times and manifests itself as a much greater change in the grid potential at tube 79. The arrangement is such that practically any desired sensitivity can be obtained. A drop in the battery voltage of no more than .1 volt, for example, is sufficient, with proper adjustment, to shift the phase of the grid voltages at the thyratrons 91 and 92 over the whole working range and change the rectifier from no load to full load condition.

From all the foregoing it will be clear that the invention is effective to maintain a substantially constant battery voltage under different load conditions and is adapted to use, therefore, in various situations where a constant battery voltage is a prime consideration.

A further advantage will be evident from the fact that the charging system picks up the load in response to the initial drop in battery voltage which takes place immediately upon application of a load and before the battery has supplied any substantial amount of energy to the load. As the result, the battery is maintained in approximately fully charged condition, ready to deliver its full output to the load in the event of power failure. Thus the invention is well adapted for use in situations where a constant battery voltage may not be required but a fully charged battery is a necessity.

The invention having been described, that which is believed to be new and for which the protection of Letters Patent is desired will be pointed out in the appended claims.

I claim:

1. In a battery charging system, means for charging a storage battery, means for providing a standard voltage bearing a predetermined relation to the battery voltage when the battery is fully charged, means for continuously comparing said voltages while the battery is being charged, said voltage comparing means comprising a spare discharge device having grid and cathode elements between which a potential is maintained equal to the difference between the battery voltage and said standard voltage, and means controlled by said device for stopping the charge responsive to the establishment of said predetermined relation by an increase in the battery voltage.

2. In a battery charging system, means for charging a storage battery, means for providing a standard voltage, which bears a predetermined relation to the battery voltage when the battery is fully charged, means for continuously comparing said voltages while the battery is not being charged, said voltage comparing means comprising a spare discharge device having grid and cathode elements between which a potential is maintained equal to the difference between the battery voltage and said standard voltage, and means controlled by said device responsive to a predetermined change in the difference between said voltages for starting the operation of said charging means.

3. In a battery charging system, a rectifier for charging a storage battery and for supplying current to a load connected to said battery, means for providing a standard voltage which always differs substantially from the battery voltage, means for continuously comparing the battery voltage with said standard voltage, and means sensitive to changes in the difference between said voltages for maintaining the output of said rectifier substantially equal to the load.

4. In a battery charging system, means including a rectifier for supplying current to charge a storage battery, said rectifier including a grid controlled gas filled tube, a phase shifting circuit for varying the phase of the grid voltage at said tube with respect to the anode voltage to control the charging rate, means for providing a standard voltage, means for comparing the battery voltage with said standard voltage while the battery is being charged, and means for controlling said phase shifting circuit in accordance with the difference between said voltages.

5. In a battery charging system, a battery charging circuit including a rectifier, said rectifier including a grid controlled gas filled tube, means for providing a standard voltage, means for continuously comparing the battery voltage with said standard voltage while the battery is being charged, and means for shifting the grid voltage at said tube enough out of phase with the anode voltage to stop the charge when the comparison indicates that the battery is charged to the desired extent.

6. In a battery charging system, a battery charging circuit including a storage battery and a thyratron tube operating as a rectifier, means including a phase shifting circuit for impressing a voltage on the grid of said tube which lags the anode voltage by a sufficiently large angle to prevent said tube from firing, means for providing a standard voltage, means for comparing the battery voltage with said standard voltage, and means responsive to a predetermined decrease in the battery voltage with respect to said standard voltage for controlling said phase shifting circuit to advance the phase of the grid voltage at said tube and start current flow in said charging circuit.

7. In a battery charging system, a battery charging circuit including a storage battery and a thyratron tube operating as a rectifier, a phase shifting circuit for varying the phase relation between the grid and anode voltages at said tube, an amplifying tube for controlling said phase shifting circuit, means for providing a standard voltage, and means for impressing on the grid of said amplifying tube a potential which is equal to the difference between the battery voltage and said standard voltage.

8. In a battery charging system, a rectifier for charging a storage battery, said rectifier including a grid controlled gas filled tube, a phase shifting circuit for varying the phase of the grid voltage at said tube with respect to the anode voltage to control the charging rate, said circuit including an inductive winding as a control element, a second inductive winding inductively coupled to said first winding, a space discharge tube having an anode circuit which includes said second winding, means for providing a standard voltage of constant value, and circuit connections for maintaining a negative bias on the grid of said discharge tube which is proportionate to the difference between the battery voltage and said standard voltage.

9. In a battery charging system, means for supplying current to charge a storage battery, a source of standard voltage of constant value, a space discharge device, a cathode grid circuit for said device including said battery and said source in series opposition, whereby the grid voltage depends on the difference between the battery voltage and the standard voltage, a cathode anode circuit for said device including an inductive winding, a second winding inductively coupled to said first winding, and means for utilizing changes in the inductance of said second winding to vary the charging rate.

10. In a battery charging system, means including a rectifier for charging a storage battery and for supplying current to a load connected thereto, means for providing a standard voltage of constant value which is higher than the battery voltage at full charge, a space discharge device having cathode, grid, and plate elements, circuit connections for impressing a potential between said cathode and grid elements which is proportional to the difference between the battery voltage and said standard voltage, said grid element being negative with respect to said cathode under different load conditions over the range from no load to full load, and means responsive to changes in the negative potential on said grid for maintaining the output of said rectifier proportionate to the load throughout said range.

SAMUEL A. JOHNSTON.